US006308724B1

(12) United States Patent
Haruch et al.

(10) Patent No.: US 6,308,724 B1
(45) **Date of Patent: *Oct. 30, 2001**

(54) LOW CAPACITY CHLORINE GAS FEED SYSTEM

(75) Inventors: David Haruch, Media, PA (US); Mario D. Cabrera, Towaco, NJ (US); Albert Van Grouw, North Haledon, NJ (US); Gregory Stockinger, Pompton Plains, NJ (US)

(73) Assignee: United States Filter Corporation, Palm Desert, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/569,157

(22) Filed: May 11, 2000

Related U.S. Application Data

(63) Continuation-in-part of application No. 08/981,242, filed on Apr. 3, 1998, now Pat. No. 6,105,598.

(51) Int. Cl.[7] .................... F16K 11/044

(52) U.S. Cl. .................... 137/1; 137/111; 137/112; 137/114; 137/625.4; 137/907

(58) Field of Search .................... 137/111, 112, 137/113, 114, 625.4, 907, 888

(56) References Cited

U.S. PATENT DOCUMENTS

| | | | |
|---|---|---|---|
| 2,547,823 | | 4/1951 | Josephian . |
| 2,578,042 | | 12/1951 | Chandler . |
| 2,630,821 | | 3/1953 | Arey et al. . |
| 2,641,273 | | 6/1953 | Siebens . |
| 2,754,659 | * | 7/1956 | Dick . |
| 2,775,980 | | 1/1957 | Renaudie . |
| 3,001,541 | | 9/1961 | St. Clair . |
| 3,133,440 | | 5/1964 | Conkling . |
| 3,141,331 | | 7/1964 | Wilson . |
| 3,154,945 | | 11/1964 | Busillo . |
| 3,181,358 | | 5/1965 | Busillo . |
| 3,194,264 | * | 7/1965 | Greco .................... 137/625.4 |
| 3,220,430 | | 11/1965 | Haskett . |
| 3,342,068 | | 9/1967 | Metzger . |
| 3,544,212 | | 12/1970 | Maroney . |
| 3,604,445 | * | 9/1971 | Jordan .................... 137/113 |
| 3,646,958 | | 3/1972 | Braas . |
| 3,691,835 | | 9/1972 | Metzger . |
| 3,693,653 | * | 9/1972 | Cramer et al. .................... 137/625.4 |
| 3,779,268 | | 12/1973 | Conkling . |
| 3,989,186 | * | 11/1976 | McMichael .................... 137/111 |
| 4,050,305 | | 9/1977 | Evans et al. . |
| 4,099,412 | | 7/1978 | Nehrbass . |
| 4,197,809 | | 4/1980 | Johnson . |
| 4,202,180 | | 5/1980 | Cox . |
| 4,223,557 | | 9/1980 | Brinkman . |
| 4,241,749 | | 12/1980 | Petursson . |
| 4,245,513 | | 1/1981 | Clements et al. . |

(List continued on next page.)

FOREIGN PATENT DOCUMENTS

| | | |
|---|---|---|
| 44650 | 4/1908 | (CH) . |
| 868.515 | 12/1940 | (DE) . |
| 2012702 | 10/1970 | (DE) . |
| 2206280 | 6/1974 | (FR) . |
| 55-118109 (A) | 9/1980 | (JP) . |
| WO 87/05133 | 8/1987 | (WO) . |

*Primary Examiner*—Stephen M. Hepperle
(74) *Attorney, Agent, or Firm*—Wolf, Greenfield & Sacks, P.C.

(57) ABSTRACT

A switchover device for providing a continuous supply of a gas such as chlorine to a water system. The switchover device includes an outlet in communication with a chamber as well as with a vacuum source and two inlets also in communication with the chamber. The switchover device further contains a shuttle that may be positioned to isolate the first inlet, the second inlet, or neither inlet.

19 Claims, 5 Drawing Sheets

U.S. PATENT DOCUMENTS

| | | |
|---|---|---|
| 4,250,144 | 2/1981 | Ratigan . |
| 4,254,789 | 3/1981 | Westberg . |
| 4,254,790 | 3/1981 | Eriksson et al. . |
| 4,257,279 | 3/1981 | Marx . |
| 4,324,267 | 4/1982 | Bach . |
| 4,333,833 | 6/1982 | Longley et al. . |
| 4,341,234 | 7/1982 | Meinass et al. . |
| 4,489,016 | 12/1984 | Kriebel . |
| 4,655,246 | 4/1987 | Phlipot et al. . |
| 4,674,526 | 6/1987 | Athanassiu . |
| 4,752,211 | 6/1988 | Sabin . |
| 4,830,743 | 5/1989 | Koster et al. . |
| 4,867,413 | 9/1989 | Tessler . |
| 4,923,092 | 5/1990 | Kirschner et al. . |
| 4,986,122 | 1/1991 | Gust . |
| 4,993,684 | 2/1991 | Prina . |
| 5,046,701 | 9/1991 | Barber . |
| 5,083,546 | 1/1992 | Detweiler et al. . |
| 5,095,950 | 3/1992 | Hallberg . |
| 5,151,250 | 9/1992 | Conrad . |
| 5,158,748 | 10/1992 | Obi et al. . |
| 5,189,991 | 3/1993 | Humburg . |
| 5,193,400 | 3/1993 | Lew . |
| 5,320,128 | 6/1994 | Tablert . |
| 6,105,598 * | 8/2000 | Cabrera et al. .................. 137/114 X |

* cited by examiner

LOW CAPACITY CHLORINE GAS FEED SYSTEM

RELATED APPLICATIONS

This application is a continuation-in-part of U.S. application Ser. No. 08/981,242, filed Apr. 3, 1998, titled "Low Capacity Chlorine Gas Feed System," now U.S. Pat. No. 6,105,598.

BACKGROUND OF THE INVENTION

1. Field of the Invention

The invention relates to a switchover device for a low capacity gas feed system of the type for use in feeding chlorine gas to a water supply to chlorinate the water. More specifically the invention relates to a switchover device for controlling gas flow from different gas supplies.

2. Related Art

Low capacity chlorine gas feed systems provide for the supply of gas from chlorine gas containers through a gas pressure regulator device to an injector wherein the chlorine gas is delivered to a water supply conduit. One chlorine feed system is illustrated in the assignee's Technical Data Sheet 910.250 titled "SONIX 100™ Chlorinator." Attention is also directed to Conkling, U.S. Pat. No. 3,779,268, illustrating a regulator valve for a chlorine gas system.

One limitation of some chlorine gas supply systems is the amount of chlorine which can be delivered to the water supply. Use of a single gas cylinder permits the discharge of chlorine gas only at a limited flow rate before frosting of the valve makes the gas regulator valve inoperative.

In many areas, chlorine gas suppliers require that chlorine tanks be emptied completely before they can be returned to the supplier for refilling. Existing gas regulation systems have not provided an effective mechanism for insuring efficient use of all of the chlorine in the tanks. In other areas, chlorine gas suppliers require that chlorine tanks returned for refilling contain a predetermined quantity of chlorine in the tanks. Some gas regulation systems do not provide an effective mechanism for controlling the amount of gas left in the gas supply cylinders.

Another limitation of some chlorine gas systems is that they have not provided an effective and efficient system for switching over from one chlorine supply container to another chlorine supply container once the supply in the first container is exhausted. Further, some gas feed systems do not insure complete use or controlled use of the gas in the first container; other systems require mechanically complex regulator valve assemblies, and are expensive and unreliable.

SUMMARY OF THE INVENTION

The present invention provides a switchover device for a gas supply system. The switchover device includes an outlet in fluid communication with a vacuum source and a chamber. The device further includes two inlets each in fluid communication with a gas source and the chamber. A shuttle in the switchover device may be positioned so that it is in contact with one of the first inlet, the second inlet or with neither inlet.

In another embodiment, the present invention also provides a method for providing a gas to a gas supply system. A first gas is provided to a vacuum injector from a first source and a portion of the gas from the first source is depleted. A second gas is provided to the vacuum injector from a second source and the first gas source is further depleted while the second source is providing gas to the vacuum injector.

In another embodiment the present invention also provides for a switchover device for supplying gas to a gas supply system. The switchover device includes a valve body having an outlet, a first inlet and a second inlet. The outlet is in fluid communication with a vacuum source, the first inlet is in fluid communication with a first gas source and the second inlet is in fluid communication with a second gas source. The first inlet, the second inlet, or neither inlet may be selectively isolated from the outlet.

DETAILED DESCRIPTION OF THE INVENTION

The invention includes a switchover device for selectively supplying gas to a vacuum injector system from a first gas source, a second gas source, or both a first and second gas sources. The switchover device has an outlet in communication with a vacuum injector. The device further includes a chamber in communication with the outlet, and two inlets that may be in communication with the chamber. A shuttle within the switchover device may be positioned so that it is in contact with the first inlet, the second inlet, or neither inlet. A holding device may keep the shuttle in contact with one of the inlets. The invention further includes a method for supplying gas to a vacuum injector wherein gas is first supplied to the vacuum injector by a first gas source, which is then joined by a second source before the first source is exhausted. After the second source has begun to supply gas to the vacuum injector, the first source is more fully drained.

Figure 1:
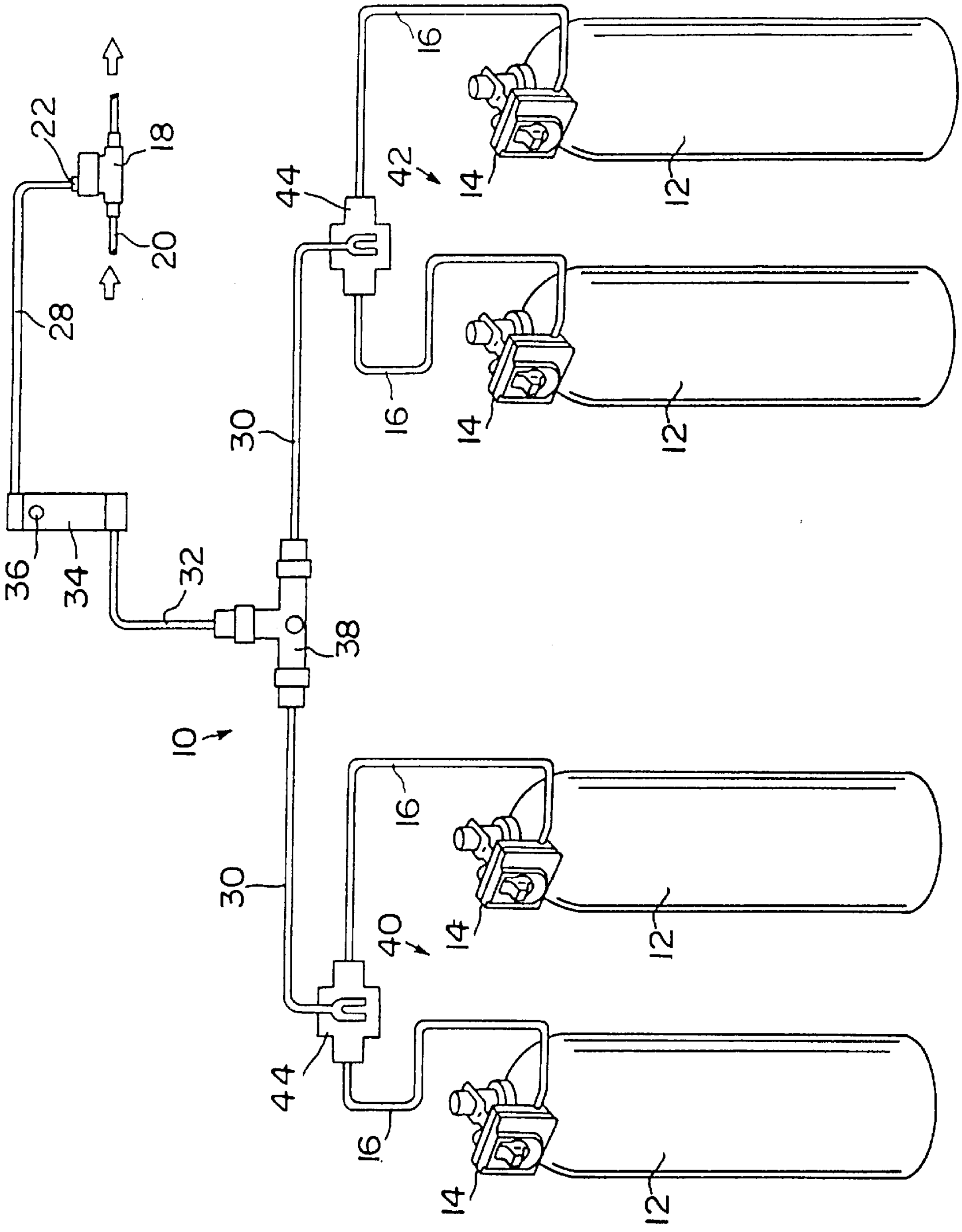
FIG. 1 is a schematic illustration of a gas supply system embodying the invention.
Figure 3:
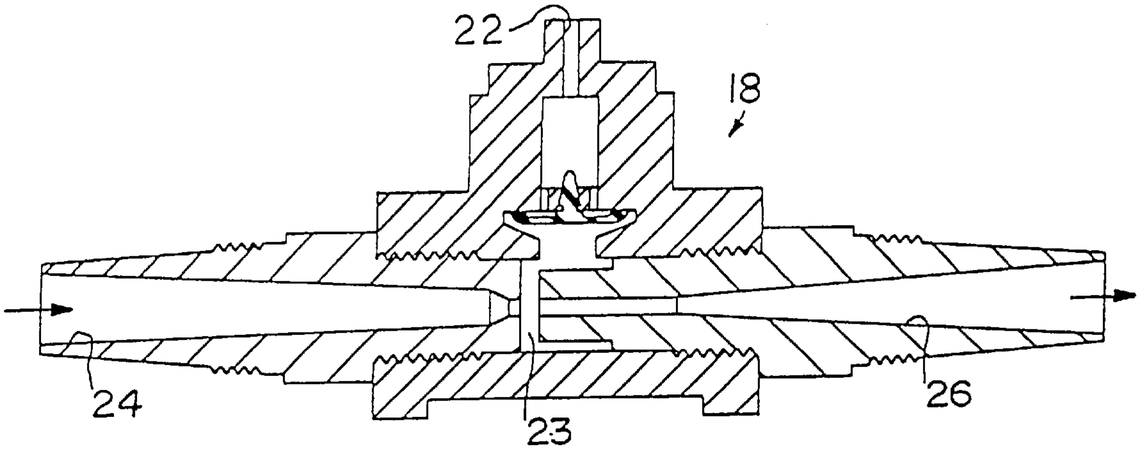
FIG. 3 is an enlarged cross sectional view of a gas injector included in the gas supply system shown in FIG. 1.

FIG. 1 illustrates a gas feed system embodying the invention and including a plurality of gas cylinders 12. In the illustrated arrangement the gas cylinders 12 are conventional chlorine gas containers. The gas feed system 10 further includes a vacuum regulator 14 mounted on each cylinder 12, each of the vacuum regulators 14 comprising a vacuum operated valve intended to control the supply of chlorine gas from the gas cylinders 12. The vacuum regulators 14 are connected through plastic tubing or conduits 16 to supply chlorine gas to a chlorine gas injector 18. The chlorine gas injector 18 is best shown in FIG. 3. The gas injector 18 provides for mixing of gas into water flowing through a water supply conduit 20 and facilitates the injection of chlorine gas into the water supply. At the injector 18, metered gas entering port 22 is dissolved at chamber 23 in the water stream flowing through passage 24 from the water supply conduit 20. The resultant solution is discharged through passage 26 to the point of application and the flow of water through the injector 18 generates a vacuum at port 22 and in the tubing or conduit 28. It is this vacuum in the tubing 28 which draws gas through the conduits 16, 30 and 32 into the injector 18 and which operates the vacuum regulators 14 connected to the cylinders 12.

In the illustrated arrangement of the gas feed system, a rotameter 34 is provided between the gas feed cylinders 12 and the injector 18. The rotameter 34 indicates the volume or rate of the flow of gas through the tubing 32 and 28 to the injector 18. The rotameter 34 can also include a control valve 36 for controlling the rate of flow through the tubing 32 and 28 to the injector 18. The construction of the rotameter 34 and the control valve 36 is conventional and will not be described in detail. While in the illustrated arrangement the rotameter 34 is mounted remote from the vacuum regulators 14, in other arrangements a rotameter 34 could be mounted directly on each vacuum regulator to indicate the flow of gas from the individual gas cylinders 12 to the tubing 16.

The gas supply system 10 shown in FIG. 1 further includes a remote switchover device 38 for providing for supply of chlorine gas from a first bank 40 of cylinders during initial operation of the chlorine gas system while maintaining a second bank 42 of cylinders in a standby condition. The remote switchover device 38 includes a valve which isolates the second bank 42 of cylinders during initial operation of the cylinders and then, when the gas in the first bank 40 of cylinders nears an empty condition, the remote switchover device 38 opens to provide for supply of gas from the second bank 42 of cylinders to the injector 18 while also maintaining the first bank 40 of cylinders in communication with the injector 18 so that all of the gas in the first bank 40 of cylinders can be used.

The remote switchover device 38 can then be manually switched over to connect only the second bank 42 of cylinders to the injector 18 and to isolate the first bank 40 of cylinders. The cylinders 12 in the first bank 40 can then be removed from the system for refilling and be replaced with full gas containers. The remote switchover device 38 can then maintain those containers 12 in the standby condition until the second bank 42 of cylinders nears an empty condition.

In the gas supply system 10 illustrated in FIG. 1, each bank of cylinders 40 and 42 further includes an even drawdown device 44 connecting the two vacuum regulators 14 in that bank of cylinders to the tubing 30 communicating with the remote switchover device 38 and the injector 18. The even drawdown device 44 provides for simultaneously even or equal flow of gas from the two cylinders 12 in the bank of cylinders 40 to the remote switchover device 38.

The switchover device serves to first supply gas from an initial source and then, in a response to a change in condition, the switchover device adds another supply so that both the first source and a second source are supplying gas to the system. After the first source is further drawn down to a chosen level, the switchover device may isolate the first source so that the second source is the sole supply of gas to the system. The switchover device may be operated manually, may operate mechanically, or may be electronically controlled through the use of a microprocesser. The switchover device may use multiple valves working in conjunction with each other or may use a single valve to switch back and forth between the various gas sources. The switchover device may comprise a valve body having one or more outlets and any number of inlets. The outlets lead to a vacuum source such as a vacuum injector system used to treat a municipal water supply with chlorine. The inlets may be attached to a gas source such as a tank of compressed chlorine gas or an even drawdown device that is in turn attached to a number of tanks of gas.

The switchover device may contain a shuttle that can move back and forth from one inlet to another, sealing off one inlet at a time while allowing the other to remain in communication with the outlet. In a neutral position, the shuttle is not in contact with any of the inlets and allows gas to enter from all attached sources. A biasing force, such as a spring, causes the shuttle to seek this neutral position. The shuttle may be moved toward one of the inlets through the use of a control mechanism that may be accessable remotely from the switchover device. The control mechanism may be electrical or mechanical and may be operated either manually or automatically. One such control mechanism is a rack and pinion system where a rack is integrally attached to the shuttle and teeth on the rack interact with complimentary teeth on a pinion that extends through the switchover device. The pinion may be rotated externally by, for example, a belt, a motor, or a manually controlled knob. Once in contact with one of the inlets, the shuttle may be fixed in contact with the inlet by counteracting this neutral biasing force. This counteracting force may be provided by a holding device that keeps the shuttle in contact with the inlet, for example, a detent mechanism, a ratchet and pawl, or a solenoid. This counteracting force is set at a level whereby it will be overcome by a combination of the neutral biasing force and the force resulting from an increase in vacuum due to a depletion of the active gas supply.

As a gas supply feeding the system is depleted, the speed with which the gas may fill the vacuum created by the vacuum source is decreased, resulting in a drop in pressure at or around the outlet of the switchover device. This resulting drop in pressure may be communicated to the holding device in any number of ways. For example, the outlet may be in communication with a pressure transducer that electrically communicates with the holding device or, alternatively, a simple diaphragm mechanically connected to the holding device may be used. Preferably, a flexible diaphragm having one side at atmospheric pressure and the other in communication with the outlet is mechanically connected to a holding device. For example, if the holding device is a detent mechanism such as a notch and plunger combination, one end of the plunger may be attached to the diaphragm and the opposite end of the plunger may be seated in the notch to form the holding device. As the pressure in the outlet decreases, the atmospheric pressure on the opposing side of the diaphragm deflects the diaphragm in the direction of lower pressure and the attached plunger is pulled out of the notch, thus releasing the shuttle to conform to the neutrally biased position, out of contact with both inlets. The size of the diaphragm may be chosen so that when the pressure at the outlet changes enough that it is apparent that the current gas supply will soon be inadequate, the force acting on the diaphragm is great enough to release the holding device. For instance, the diaphragm may be sized so that the force acting on it is adequate to release the holding device when the vacuum in the chamber increases from about 20" $H_2O$ to about 40" $H_2O$. The triggering point for the mechanism may be adjusted, for example, by changing the length of the plunger section that is engaged with the notch, by adjusting a biasing spring applying a force to the diaphragm, or by adjusting the tension of another biasing spring that may be applying a centering force to the shuttle.

Once this release mechanism has been triggered and the shuttle has moved to its neutral position, both gas sources are open to the outlet and an adequate supply of gas to the system may be maintained. Once the spent gas supply has been depleted to the extent desired, it may then be isolated from the system and replaced with a fresh source. Once the source is replaced, the shuttle may be moved to contact the inlet so that the new gas source is isolated until the pressure in the outlet again reaches a predetermined low. In this manner, an uninterrupted supply of gas may be maintained while facilitating the complete, or near complete, emptying of the gas sources.

Figure 4:
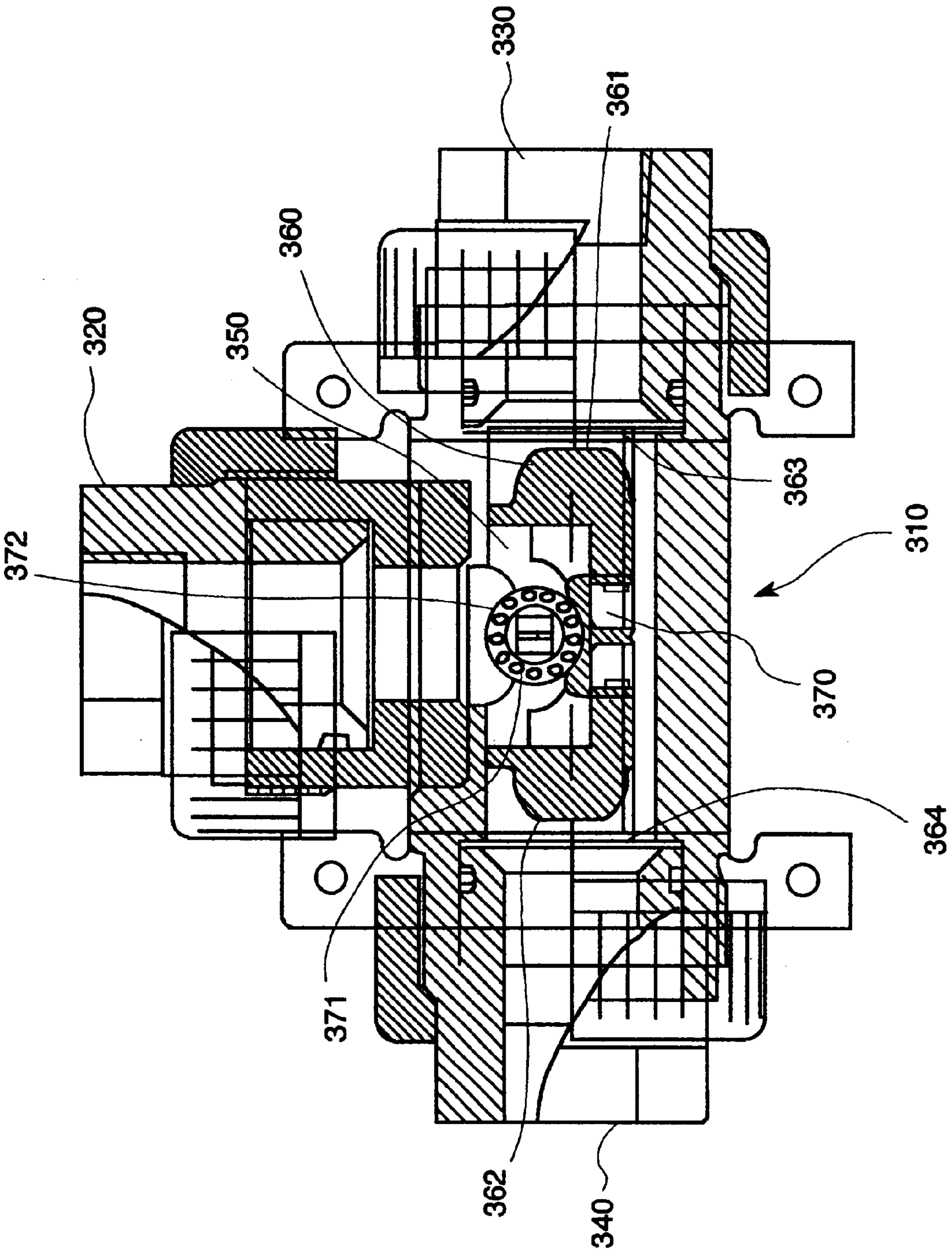
FIG. 4 is a cross sectional view of a switchover device of the present invention.
Figure 5:
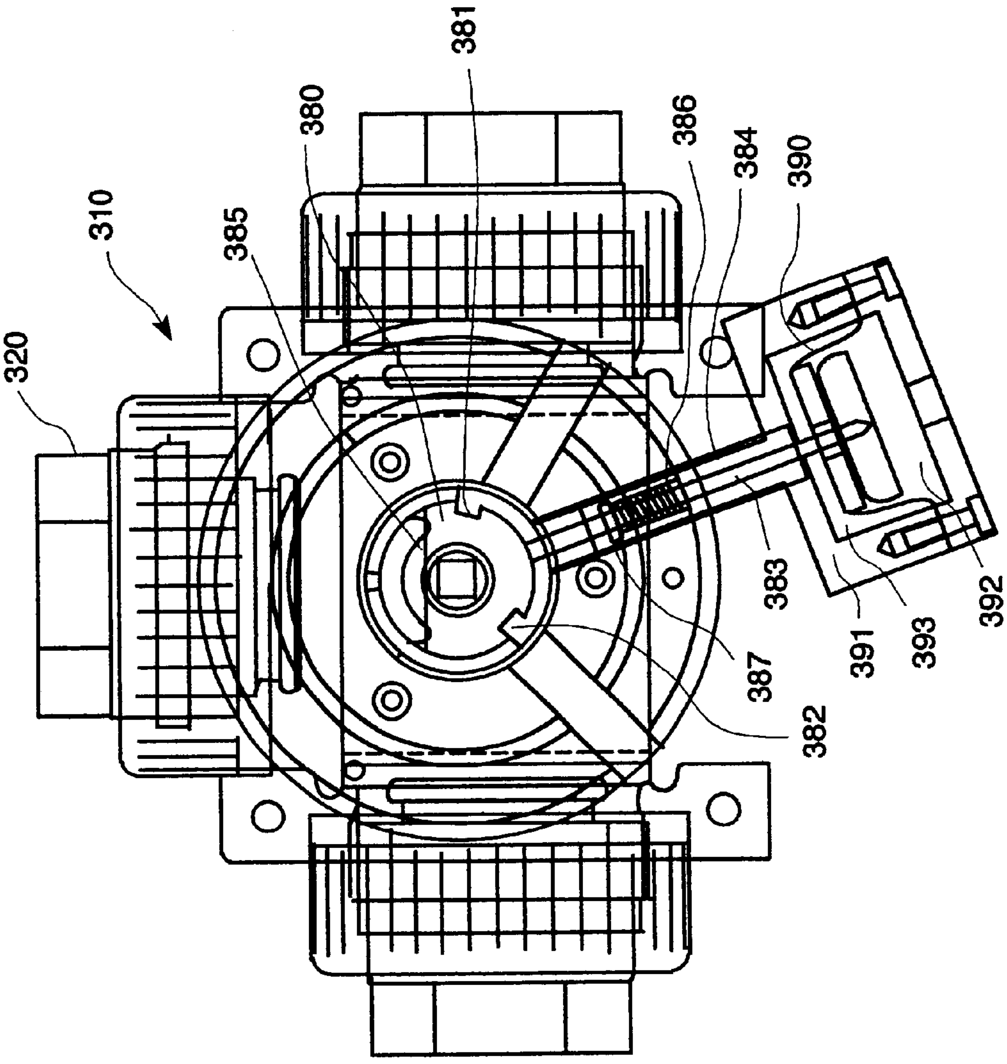
FIG. 5 is another cross sectional view of the switchover device depicted in FIG. 4.
Figure 6:
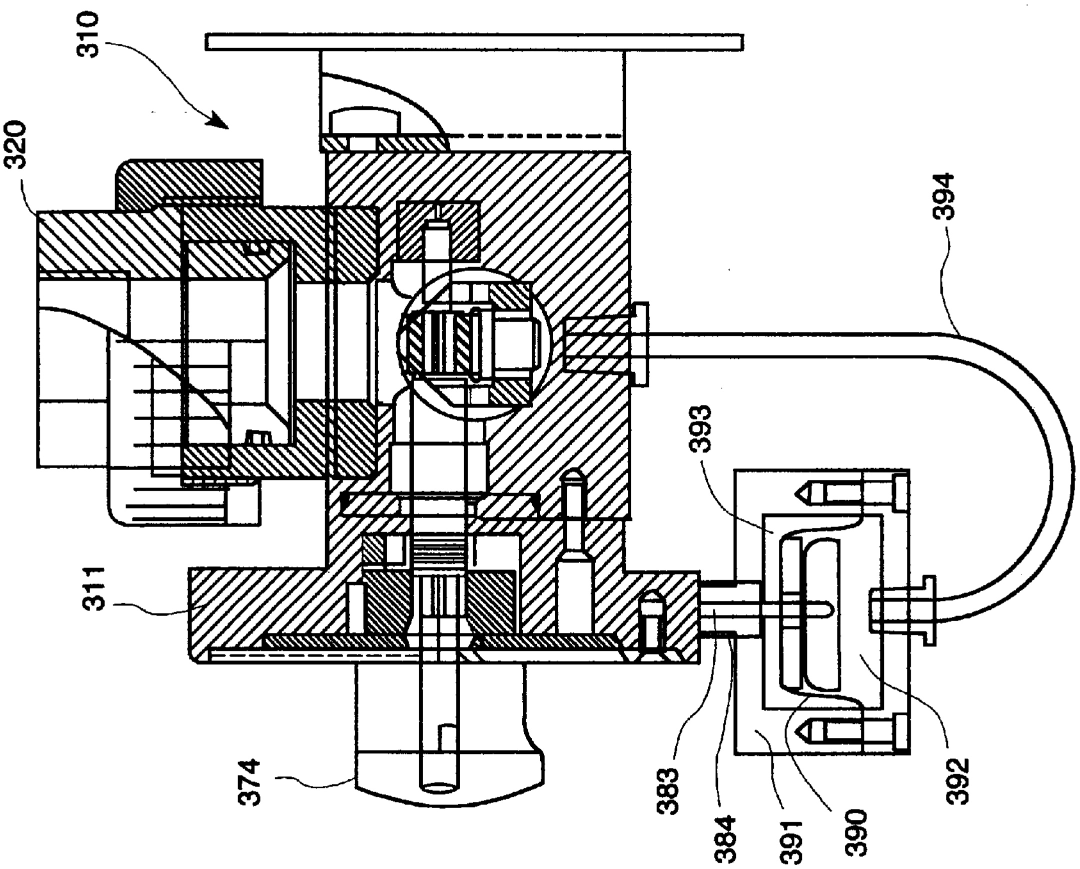
FIG. 6 is an alternative cross sectional view of the switchover device depicted in FIG. 4.

One embodiment of the switchover device is illustrated in FIGS. 4, 5, and 6. This embodiment includes a T-shaped valve body 310 that has an outlet 320 leading to the vacuum injector (not shown), a first inlet 330 that is fluidly connected to a first source of a gas (not shown) and a second inlet 340 that is fluidly connected to a second source of a gas (not shown). Each of the inlets and the outlet 320 are in communication with a chamber 350 through which gases flow from either inlet to the outlet.

Within the chamber is a shuttle to selectively seal off one or neither of the inlets. The shuttle may be movable between various positions in the chamber and preferably is slidably movable between either of two opposing inlets and a neutral position where neither of the inlets is in contact with the shuttle. The shuttle may be made of a material that is resistant to the gaseous environment to which it is exposed. Suitable materials include glass, metallic alloys, synthetic polymers and chemically resistant synthetic polymers such as polytetrafluoroethylene. The shuttle may be a solid piece of a chemically resistant material or may be either partially or completely coated with a chemically resistant material to promote longevity when exposed to a harsh gas environment such as that encountered in a system supplying chlorine or ammonia gas to a vacuum source. It is preferred that the surface of the shuttle that contacts the inlets include a surface structure that allows the shuttle to make a gas-tight seal with the inlet.

One such material has been found to be TEFLON® brand polytetrafluoroethylene which may be molded or machined to form shuttle 360 shown in FIG. 4. Shuttle 360 has two opposing ends, 361 and 362. Each of the opposing ends is configured to seal off one of the inlets when the shuttle is moved either left or right to mate with elastomeric seat 363 or 364. For instance, if the shuttle is slid toward inlet 330, end 361 forms a seal with elastomeric seat 363 thus preventing the flow of gas from inlet 330 into chamber 350. Likewise, the shuttle may be moved in the opposite direction so that end 362 seals off inlet 340 by forming a gastight seal with elastomeric seat 364. Seats 363 and 364 may be formed of a chemically resistant material that can withstand the rigors of the gas environment that the seats may be exposed to. One such material is VITON® brand fluoroelastomer which has been found to adequately withstand a chlorine gas environment. Each of the elastomeric seats 363 or 364 may be formed so that the seat applies an opposing force to that provided by the shuttle. This opposing force may help in providing a better seal between ends 361 or 362 and elastomeric seats 363 or 364, which in turn may help prevent gas from leaking between the elastomeric seat and the shuttle. In FIG. 4, elastomeric seats 363 and 364 are backed up with a Belleville spring (not shown) to provide a force opposing the force of the shuttle.

The switchover device may include a control mechanism that allows the position of the shuttle to be controlled externally of the gaseous environment. The control mechanism may be electrical or mechanical and may be controlled manually or automatically. The control mechanism may be adjustable to allow the shuttle to be moved between three or more positions, such as contacting a first inlet, contacting a second inlet, or contacting neither inlet. Some examples of appropriate control mechanisms are a solenoid, a lever, a screw, or a rack and pinion. The control mechanism may also include a holding device for maintaining the shuttle in contact with one of the inlets.

One such control mechanism which has been found to be useful is a rack and pinion as illustrated in FIG. 4. Rack 370 has a series of teeth which interact with a complimentary series of teeth 372 on pinion 371. Pinion 371 extends out of the valve body, through pinion housing 311, and is capped by a control knob 374 that is best seen in FIG. 6. The control knob 374 may be manually turned by the operator, thus rotating the pinion which in turn moves the rack causing the shuttle to slide between elastomeric seats 363 and 364. Circumferentially attached to the pinion is a collar 380 that has two notches, 381 and 382, opposed at about 120° from each other, as shown in FIG. 5. Also attached to the pinion is a torsion spring 385 that is fixed to provide a centering biasing force that tends to move the shuttle to a central, neutral position where both inlets, 330 and 340, are able to communicate with the chamber 350.

Referring again to FIG. 5, aligned perpendicular to pinion 371 is plunger 383 that is contained by sleeve 384. Compression spring 386 provides a force pushing the plunger 383 toward the collar 380. This force may be adjusted by turning nut 387 which serves to change the length of compression spring 386. When control knob 374 is rotated about 60° in either direction, compression spring 386 causes plunger 383 to slide into either notch 381 or 382, depending on whether the knob has been rotated clockwise or counterclockwise. If pinion 371 has been rotated clockwise so that plunger 383 has interlocked with notch 381, the shuttle will have contacted elastomeric seat 364 and sealed off inlet 340. Although torsion spring 385 is applying a force tending to slide the shuttle to its neutral central position, this movement is prevented by a holding device, the interlocking of notch 381 with plunger 383.

The end of plunger 383 opposite the end that is in contact with the collar 385 is attached to a diaphragm 390. The diaphragm may be made of a material that is flexible enough to allow the diaphragm to respond to a pressure differential across the diaphragm. Preferably, the diaphragm is resistant to the gases to which it may be exposed. For example, the diaphragm may include an elastomer, an alloy or a chemically resistant polymer. One such material that has been found useful in a system used for supplying chlorine gas is VITON® brand fluoroelastomer. In a system for supplying amonia gas to a vacuum injector, HYPALON® brand chlorosulfonated elastomer has been found to provide good results. Diaphragm 390 is contained in diaphragm housing 391 which is divided into two non-communicating chambers, 392 and 393. First diaphragm chamber 393 is open to the atmosphere and thus is at atmospheric pressure. Second diaphragm chamber 392 is fluidly connected to chamber 350 by vacuum tube 394 as shown in FIG. 6. Thus, diaphragm chamber 392 is at the same pressure as chamber 350. In practice, when the pressure in chamber 350 drops below a certain point, for instance when the gas supply has decreased to such a level that it can no longer fill the vacuum created in the chamber 350 by the vacuum injector, the diaphragm deflects toward the area of lower pressure. When the amount of deflection exceeds the depth of notch 381, the plunger is pulled free of notch 381 and the force supplied by torsion spring 385 rotates pinion 371 60° in a counterclockwise direction (with reference to FIG. 5.) Shuttle 360 is thereby moved to a central position where neither end of the shuttle is in contact with a seat and gas is therefore allowed to enter chamber 350 through both inlets 330 and 340. In this manner, an adequate supply of gas is supplied from a fresh source while still efficiently draining an older source.

When enough time has elapsed for the original gas source to empty completely, the control knob 374 may be rotated in the opposite direction to that done previously so that the valve connected to the depleted gas supply is sealed off from the chamber 350. At this time, the empty source may be removed and replaced. By continuously repeating this procedure, an adequate gas supply is always maintained at the vacuum injector and depleted gas sources are allowed to empty completely before they are removed.

Figure 2:
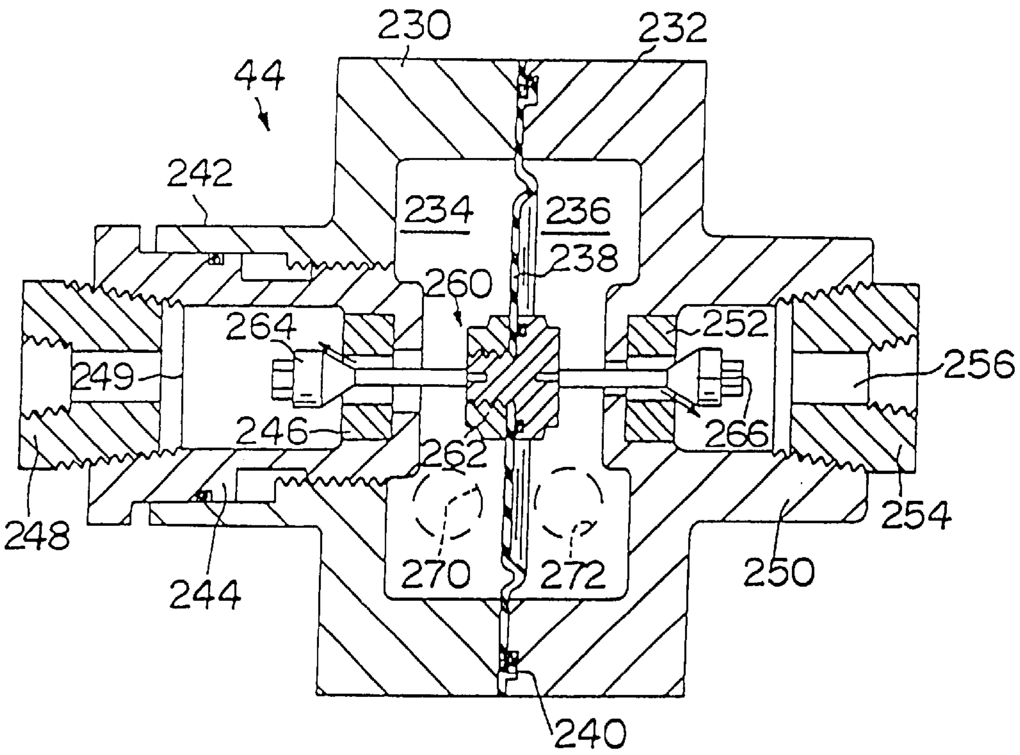
FIG. 2 is an enlarged cross sectional view of an even drawdown valve included in the gas supply system shown in FIG. 1.

FIG. 2 illustrates in greater detail the even drawdown device 44 which includes a pair of housing portions 230 and 232 defining chambers 234 and 236 separated by a diaphragm 238. The periphery of the diaphragm 238 is clamped between the halves 230 and 232 of the housing and an O-ring 240 provides a fluid tight seal. The left housing portion 230 shown in FIG. 2 includes a boss or sleeve 242 threadably housing a valve seat holder 244. A TEFLON® valve seat 246 is housed in the valve seat holder 244 and a reducing bushing 248 provides for connection of the tubing 16 with bore 249. The right housing portion 232 includes a boss or sleeve 250 housing a valve seat 252, and a reducing bushing 254 is provided for connecting the other tubing 16 to the inlet bore 256.

The even drawdown device 44 further includes a valve spool 260 having a diaphragm hub 262 clampingly engaging the central portion of the diaphragm 238 such that the valve spool 260 is movable with the diaphragm. One end of the valve spool 260 includes a valve body 264 selectively engageable with the valve seat 246 and the opposite end of the valve spool 260 includes a second valve body 266 engageable with the second valve seat 252. The second valve seat 252 includes a plurality of small orifices 268 between the valve body 266 and the valve seat 252 to permit controlled gas flow past the valve seat 252 when the valve member 266 engages the valve seat 252. The left and right housing portions 230 and 232 are provided with discharge ports 270 and 272, respectively, which communicate with the tube 30 providing flow of gas to the rotameter and the injector 18.

In operation of the even drawdown device, vacuum in the tube 30 communicating with rotameter 34 applies a vacuum in the chambers 234 and 236 on both sides of the diaphragm 238, causing gas to be drawn initially through the orifices 268 around the valve body 266. The pressure differential caused by gas flow into the right chamber 236 as seen in FIG. 2 will create a pressure on the diaphragm 238 causing movement of the valve body 264 away from the valve seat 246 to cause flow of gas into the chamber 234 and until the gas pressure in the chambers on 234 and 236 on opposite sides of the diaphragm 238 is equal. The gas flow from the tubes 16 communicating with the two gas cylinders 12 will thus be equalized to provide for uniform and even flow from those cylinders 12 to the injector 18.

Further modifications and equivalents of the invention herein disclosed will occur to persons skilled in the art using no more than routine experimentation, and all such modifications and equivalents are believed to be within the spirit and scope of the invention as defined by the following claims.

What is claimed is:

1. A switchover device for a gas supply system comprising:

an outlet in fluid communication with a vacuum source and a chamber;

a first inlet in fluid communication with a first gas source and with the chamber;

a second inlet in fluid communication with a second gas source and with the chamber, the second inlet and the first inlet opposed to each other in the chamber; and a slidable shuttle, comprising a first end configured to seal the first inlet and a second end configured to seal the second inlet, the shuttle configured to isolate one of the first inlet, the second inlet, or neither inlet from the chamber.

2. The switchover device of claim 1 further comprising a holding device for maintaining the shuttle position.

3. The switchover device of claim 1 further comprising a spring to move the shuttle to a position where the shuttle is isolating neither inlet from the chamber.

4. The switchover device of claim 2 wherein the holding device comprises a notch and a plunger.

5. The switchover device of claim 4 further comprising a spring in contact with the plunger.

6. The switchover device of claim 4 further comprising a diaphragm having a first side and a second side, the first side being in fluid communication with the chamber.

7. The switchover device of claim 6 wherein the diaphragm is connected to the plunger.

8. The switchover device of claim 2 wherein the holding device maintains the shuttle in contact with either the first inlet or the second inlet.

9. The switchover device of claim 1 wherein the vacuum source is a vacuum injector.

10. A method for providing gas to a gas supply system comprising the steps of:

providing a first gas to a vacuum injector from a first gas source;

depleting a portion of the gas from the first gas source;

providing a second gas to the vacuum injector from a second source; and further depleting the gas from the first gas source while the second source is providing gas to the vacuum injector.

11. The method of claim 10 wherein each gas is chlorine gas.

12. The method of claim 10 wherein at least one of the sources is an equal drawdown device.

13. A switchover device for supplying gas to a gas supply system comprising:

a valve having an outlet, a first inlet and a second inlet, the outlet in fluid communication with a vacuum source, the first inlet in fluid communication with a first gas source wherein the first gas source is a gas cylinder, and the second inlet in fluid communication with a second gas source; and means for selectively isolating the first inlet from the outlet, the second inlet from the outlet, or neither inlet from the outlet.

14. The switchover device of claim 13 wherein the means for selectively isolating is biased to allow communication between both inlets and the outlet.

15. The switchover device of claim 14 further comprising means for maintaining the means for selectively isolating in contact with the first outlet or the second outlet.

16. A switchover device for a gas supply system comprising:

an outlet in fluid communication with a vacuum source and a chamber;

a first inlet in fluid communication with a first gas source and with the chamber;

a second inlet in fluid communication with a second gas source and with the chamber;

a shuttle movably configured to isolate one of the first inlet, the second inlet, or neither inlet from the chamber; and a holding device for maintaining the shuttle position, wherein the holding device comprises a notch and a plunger.

17. The switchover device of claim 16 further comprising a spring in contact with the plunger.

18. The switchover device of claim 16 firther comprising a diaphragm having a first side and a second side, the first side being in fluid communication with the chamber.

19. The switchover device of claim 18 wherein the diaphragm is connected to the plunger.

* * * * *